July 23, 1963  M. BROMBERG  3,098,639
CABLE GUIDING APPARATUS
Filed June 28, 1961 3 Sheets-Sheet 1
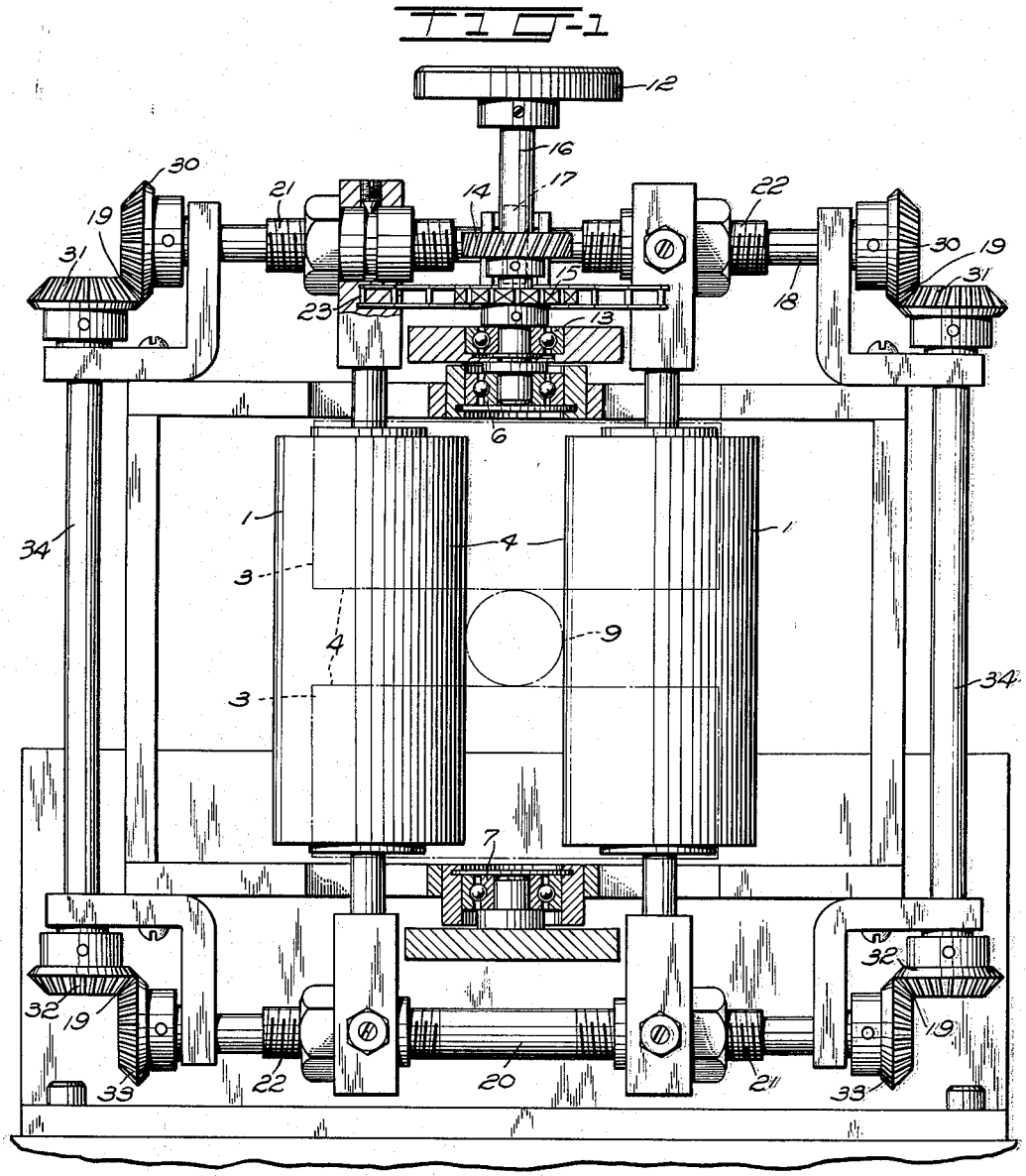
INVENTOR
M. BROMBERG July 23, 1963
M. BROMBERG
3,098,639
CABLE GUIDING APPARATUS
Filed June 28, 1961
3 Sheets-Sheet 2
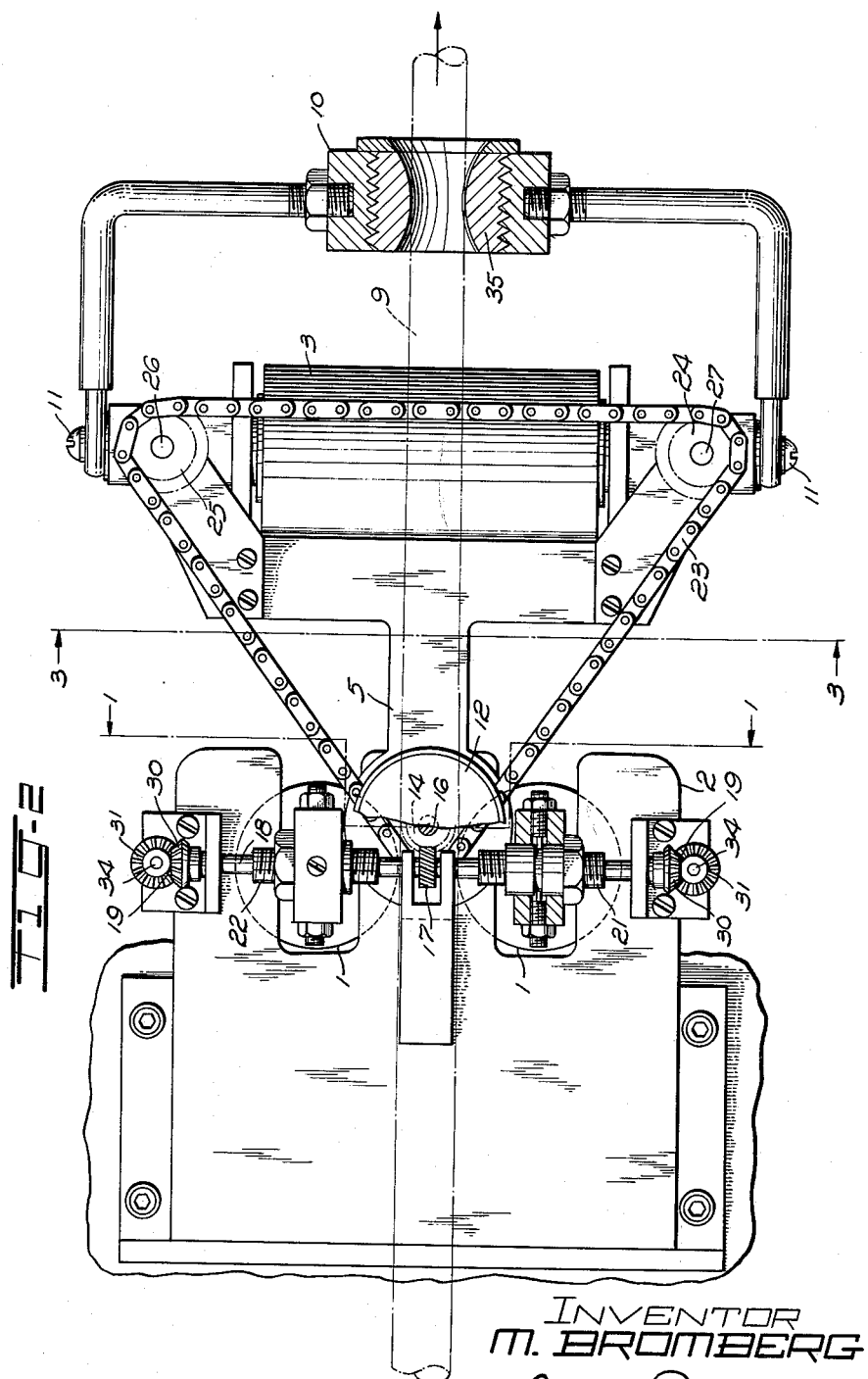
INVENTOR
M. BROMBERG
By W.C. Parnell
ATTORNEY

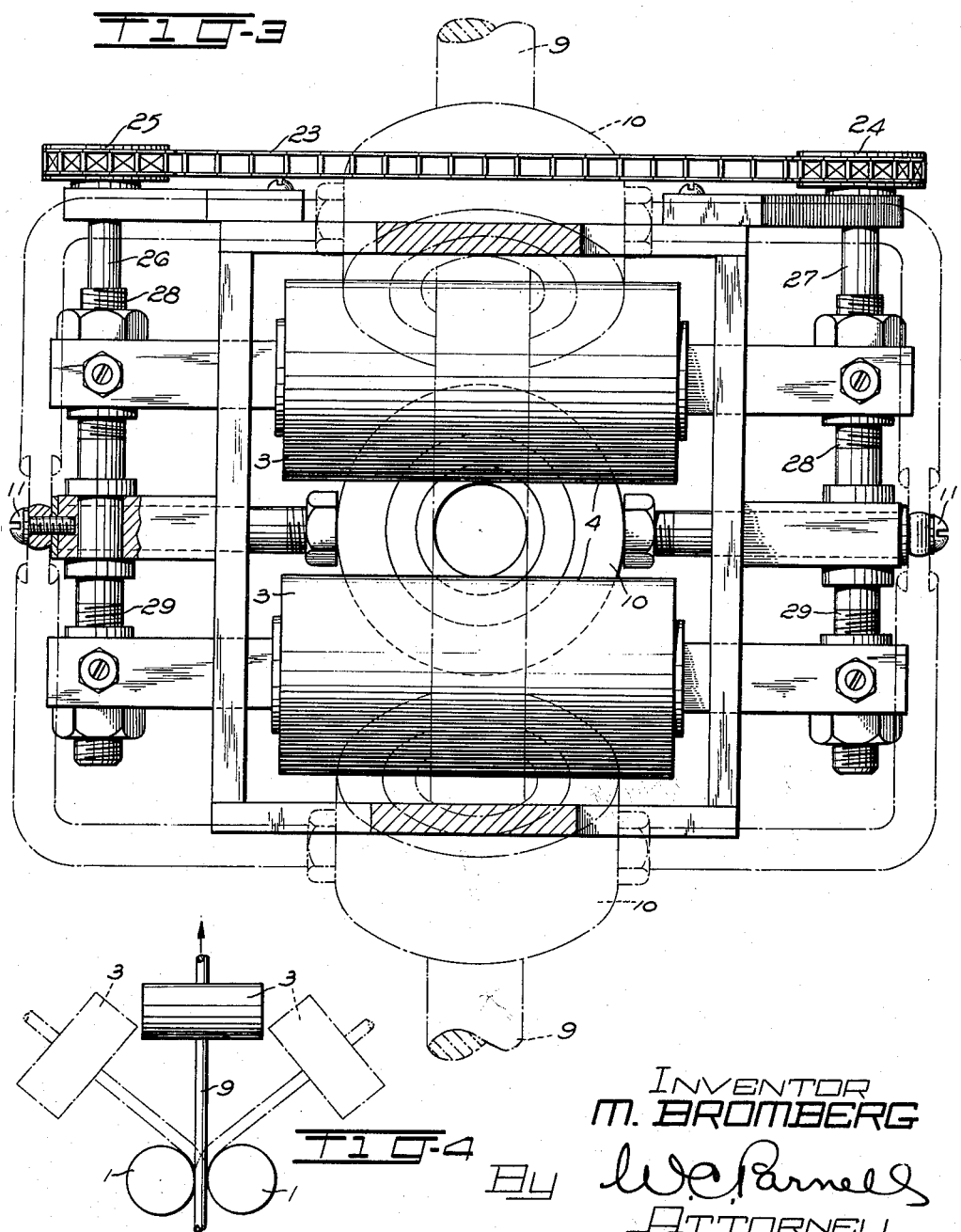

United States Patent Office 3,098,639
Patented July 23, 1963

3,098,639
CABLE GUIDING APPARATUS
Menashe Bromberg, West Orange, N.J., assignor to Western Electric Company, Incorporated, New York, N.Y., a corporation of New York
Filed June 28, 1961, Ser. No. 120,370
7 Claims. (Cl. 254—190)

This invention relates to apparatus for guiding cables and particularly to cable guiding apparatus for distributing cable on takeup reels.

When the cable is to be wound on a takeup reel, it is important that the cable be guided in a path designed to produce a uniform distribution of cable. The cable guiding apparatus must straighten the cable before winding and allow for its horizontal and vertical motion as the takeup reel revolves. Furthermore, there is the possibility of cable damage due to broken conductors, insulation splits and similar causes when the moving cable changes direction and is not delivered perpendicular to the axis of the guiding rollers. The guiding apparatus must protect the cable from such adverse effects by compensating for the universal winding motion of the cable while at the same time preventing the angular movement of the cable with respect to the guiding elements. The apparatus should also be sufficiently flexible to handle changes in cable size without relinquishing control over the cable path.

An object of this invention is an apparatus for guiding varied size cables in a given path and which can be readily adjusted to accommodate the variations in cable size.

In accordance with the general features of this invention, varied size cables are guided singly in a given path by passing the cable through pairs of vertical and horizontal rollers situated normal to the cable. The cable is first guided by a pair of adjustable vertical rollers disposed opposite each other, then by a pair of horizontally opposed rollers also of an adjustable nature, and finally, passes through a bellmouth guide to the takeup reel. The horizontal rollers are located on a yoke-type structure which is free to pivot horizontally on its support. Attached to the yoke-type structure is a bellmouth guide which is pivoted to move in a vertical direction. The combination of these movements compensates for the universal winding movement of the takeup reel and accurately presents the cable for a proper distribution.

Since it is desirable for purposes of flexibility to accommodate different size cables, this invention contains means for readily adjusting the cable guide apparatus comprising a hand control actuating a gear system to drive screws controlling the vertical roller settings. A driving sprocket is also actuated by the hand control to adjust the horizontal rollers through a screw mechanism, chain and complementary sprocket arrangement. It is, therefore, possible to engage and guide varied size cables singly in a given path by means permitting the simultaneous adjustment of horizontal and vertical rollers to accommodate the variations in cable size.

Other objects and advantages will be apparent from the following detailed description when considered in conjunction with the accompanying drawings, wherein:

FIG. 1 is a sectional end view of the apparatus taken along the line 1—1 in FIG. 2, parts of which are shown in broken out section;

FIG. 2 is a top view of the apparatus also with broken out sections; and

FIG. 3 is a broken out sectional view of the horizontal roller setup taken along the line 3—3 in FIG. 2 with an illustration of the vertical movement of the bellmouth unit in phantom views. FIG. 4 depicts the horizontal movement of the yoke-type structure with the horizontal rollers.

With respect to the drawings, the apparatus in the present embodiment includes a pair of vertical rollers 1 disposed opposite each other in a supporting structure 2 and a pair of horizontally opposed rollers 3 defining a cable opening 4. The cable 9 is guided from the supply source (not shown) through the vertical rollers to the pair of opposed horizontal rollers 3 mounted in a yoke-type structure 5 connected on bearings at 6 and 7 to the main supporting structure 2 and free to move in a horizontal plane. Emerging from the horizontal rollers, the cable enters a bellmouth unit 10 hinged at 11 to the yoke-type member 5 and free to move in a vertical direction. The bellmouth unit 10 has a threaded insert 35 which may be changed to accommodate cables of varying diameter. The pivoting motion of the yoke-type structure and the bellmouth unit are determined by the winding motion of the cable as it becomes uniformly distributed on the takeup reel (not shown).

The simultaneous adjustment of both horizontally and vertically opposed pairs of rollers to guide different size cables is accomplished by using a hand control knob 12 to activate the control system. The control knob shaft 16 sits in a bearing 13 in the main supporting structure 2 and has a helical gear 14 and driving sprocket 15 mounted thereon. Turning the knob, therefore, controls the movement of the helical gear 14 and the driving sprocket 15 in the desired direction. Gear 17 on the threaded shaft 18 meshes with the helical gear 14 to rotate the threaded shaft and drive a bevel gear system 19 through bevel gears 30 attached to both ends of the shaft. The rotational movement of shaft 18 is transmitted by gears 30 to gears 31 on the vertical shafts 34. Gears 32 on the lower end of the shafts 34 transmit their rotational motion through gears 33 to shaft 20. The vertical rollers 1 are connected to the threaded portions 21 and 22 of shafts 18 and 20. Since the threaded portions on each shaft oppose one another, the rotation of the shafts causes the vertical rollers to move back and forth simultaneously to accommodate changes in cable size.

The horizontal rollers 3 are adjusted at the same time as the vertical rollers 2 through the action of the driving sprocket 15. The motion of the sprocket is transmitted through chain 23 to the sprockets 24 and 25 which turn the threaded shafts 26 and 27, respectively. The horizontal rollers 3 ride on the opposed threaded portions 28 and 29 of the shafts 26 and 27 and are designed to move in response to the operation of control knob 12.

What is claimed is:

1. An apparatus for guiding cables of various sizes singly in a given path to a take-up reel comprising a supporting member, a yoke-type structure pivotally mounted thereon, a first pair of diametrically opposed rollers rotatably mounted on the supporting member, a second pair of diametrically opposed rollers rotatably mounted on the yoke-type structure in a direction normal to the first pair of diametrically opposed rollers, means for adjusting each pair of rollers to accommodate cables of various sizes, and a guide unit hinged to the yoke-type structure and pivotal about an axis parallel to the axes of the second pair of rollers.

2. In apparatus according to claim 1, means for simultaneously controlling the pairs of diametrically opposed rollers situated at right angles to each other.

3. In apparatus according to claim 1 having a manual control, a gear system actuated by the manual control, threaded shafts driven by the gear system controlling the settings of the first pair of rollers, a driving sprocket simultaneously actuated by the manual control, complementary driven sprockets and a linkage, and threaded shafts responsive to the motion of the driven sprockets to determine the setting of the second pair of rollers.

4. In apparatus according to claim 1, a manual control, a gear system actuated by the manual control, a first shaft driven by said gear system, oppositely threaded portions on the shaft, meshing gears in the system to transmit the rotational motion of the shaft, a second shaft responsive to the action of the gear system, oppositely threaded portions on the second shaft, means for connecting the first pair of diametrically opposed rollers to the threaded portions of the shafts for adjustment purposes, a driving sprocket actuated by the manual control, a linkage to transmit the motion of the driving sprocket, sprockets driven by the linkage, shafts connected to the driven sprockets, oppositely threaded portions on the shafts, and means for connecting the second pair of diametrically opposed rollers to the threaded portions of the shafts so that the second roller setting is simultaneously determined by the action of the manual control.

5. Apparatus for simultaneously controlling pairs of diametrically opposed rollers situated at right angles to each other comprising a manual control, a gear system actuated by the manual control, a first shaft driven by said gear system, oppositely threaded portions on the shaft, meshing gears in the system to transmit the rotational motion of the shaft, a second shaft responsive to the action of the gear system. oppositely threaded portions on the second shaft, means for connecting the first pair of diametrically opposed rollers to the threaded portions of the shafts for adjustment purposes, a driving sprocket actuated by the manual control, a linkage to transmit the driving motion, sprockets driven by the linkage, shafts connected to the driven sprockets, oppositely threaded portions on the last named shafts, and means for connecting the second pair of diametrically opposed rollers to the threaded portions of the last named shafts so that the roller setting is determined by the action of the manual control.

6. An apparatus according to claim 1, where the guide unit hinged to the yoke-type structure comprises a bellmouth unit having an internally threaded fixed portion and a removable externally threaded insert portion.

7. An apparatus for guiding cables of different diameter comprising a first pair of spaced rollers mounted on axes extending in a first direction, a second pair of spaced rollers mounted on axes extending in a direction normal to the first direction, means pivotally mounting the second pair of rollers to pivot about an axis normal to the axes of the second pair of rollers, adjusting means for simultaneously moving the rollers of each pair toward or away from each other, and a pivotal guide means coupled to the pivotal mounting means and pivotable about an axis parallel to the axes of the second pair of rollers.

References Cited in the file of this patent
UNITED STATES PATENTS 1,538,922    Bedgood _____ May 26, 1925
2,871,011    Hercik _____ Jan. 27, 1959